(12) United States Patent
Kitamura et al.

(10) Patent No.: US 11,572,657 B2
(45) Date of Patent: Feb. 7, 2023

(54) WIRE, WIRE MANUFACTURING METHOD, AND VEHICLE DOOR

(71) Applicant: NHK SPRING CO., LTD., Yokohama (JP)

(72) Inventors: Yoshikazu Kitamura, Ina (JP); Yoshihisa Tani, Ina (JP); Shigemasa Takahashi, Ina (JP); Akihiko Kitazawa, Ina (JP)

(73) Assignee: NHK SPRING CO., LTD, Yokohama (JP)

( * ) Notice: Subject to any disclaimer, the term of this patent is extended or adjusted under 35 U.S.C. 154(b) by 264 days.

(21) Appl. No.: 16/963,542

(22) PCT Filed: Jan. 22, 2019

(86) PCT No.: PCT/JP2019/001889
§ 371 (c)(1),
(2) Date: Jul. 21, 2020

(87) PCT Pub. No.: WO2019/151054
PCT Pub. Date: Aug. 8, 2019

(65) Prior Publication Data
US 2020/0354890 A1    Nov. 12, 2020

(30) Foreign Application Priority Data
Jan. 31, 2018    (JP) .............................. JP2018-014504

(51) Int. Cl.
*D07B 1/16*    (2006.01)
*B29C 48/18*    (2019.01)
*B60J 5/04*    (2006.01)

(52) U.S. Cl.
CPC .............. *D07B 1/162* (2013.01); *B29C 48/18* (2019.02); *B60J 5/044* (2013.01); *D07B 2201/2086* (2013.01)

(58) Field of Classification Search
CPC ............................... D07B 1/162; D07B 5/006; D07B 2201/2084; D07B 2201/2086
See application file for complete search history.

(56) References Cited

U.S. PATENT DOCUMENTS 1,659,556 A * 2/1928 Bankwitz ................ D06F 53/02
57/248
3,882,665 A * 5/1975 Hughes ................ D07B 1/0693
57/7

(Continued)

FOREIGN PATENT DOCUMENTS

DE    102008019786 B3 *  8/2009  ................ F16C 1/20
JP    A S52-91944         8/1977

(Continued)

OTHER PUBLICATIONS

PCT International Search Report (w/ English Translation) and Written Opinion for corresponding PCT Application No. PCT/JP2019/001889, dated Apr. 16, 2019, 10 pages.

(Continued)

*Primary Examiner* — Shaun R Hurley
(74) *Attorney, Agent, or Firm* — Dority & Manning, P.A.

(57) ABSTRACT

A wire including a wire body that is made of metal, and a protector that is made of resin, that covers an outer periphery of the wire body, and that is integrally molded with the wire body.

8 Claims, 7 Drawing Sheets

(56) References Cited

U.S. PATENT DOCUMENTS

| | | | | |
|---|---|---|---|---|
| 4,016,714 | A | * | 4/1977 | Crandall ................. G10D 3/10 |
| | | | | 428/377 |
| 4,846,772 | A | * | 7/1989 | Saruta .................... D07B 1/162 |
| | | | | 474/271 |
| 4,923,213 | A | | 5/1990 | Yamamoto |
| 5,090,188 | A | | 2/1992 | Lin et al. |
| 5,245,887 | A | * | 9/1993 | Tanaka ...................... F16C 1/26 |
| | | | | 74/502.5 |
| 5,718,956 | A | * | 2/1998 | Gladfelter ............ B32B 27/065 |
| | | | | 138/146 |
| 5,813,290 | A | * | 9/1998 | Takahashi ............... F16C 1/223 |
| | | | | 74/501.5 R |
| 6,078,010 | A | * | 6/2000 | Funahashi ............. D07B 5/005 |
| | | | | 174/128.1 |
| 6,194,666 | B1 | * | 2/2001 | Hayashida ............... F16C 1/10 |
| | | | | 174/128.1 |
| 7,162,858 | B2 | * | 1/2007 | Graham ................. D07B 5/006 |
| | | | | 57/213 |
| 9,882,307 | B2 | * | 1/2018 | Sugita .................... H01B 7/282 |
| 2006/0260288 | A1 | * | 11/2006 | Graham ................. D07B 5/006 |
| | | | | 57/213 |
| 2011/0192131 | A1 | * | 8/2011 | Naito ..................... D07B 5/006 |
| | | | | 57/232 |
| 2011/0226081 | A1 | * | 9/2011 | Hayashida ............. F16C 1/108 |
| | | | | 74/500.5 |
| 2014/0302316 | A1 | * | 10/2014 | Gallens .................... B66B 7/06 |
| | | | | 427/180 |
| 2018/0017096 | A1 | * | 1/2018 | Jusick ........................ F16C 1/26 |
| 2019/0136584 | A1 | * | 5/2019 | Emrich ................. E05B 13/004 |

FOREIGN PATENT DOCUMENTS

| | | | | |
|---|---|---|---|---|
| JP | U S60-75916 | | 5/1985 | |
| JP | A S62-175241 | | 7/1987 | |
| JP | A H1-190861 | | 7/1989 | |
| JP | U H1-144157 | | 10/1989 | |
| JP | A H4-202870 | | 7/1992 | |
| JP | 2001132798 A | * | 5/2001 | ............... F16G 9/04 |
| JP | 2002317389 A | * | 10/2002 | ............... D07B 1/16 |
| JP | A 2010-159037 | | 7/2010 | |

OTHER PUBLICATIONS

Notice of Reasons for Refusal (with English translation) for corresponding Japanese Application No. 2018-014504, dated Apr. 14, 2020—8 pages.

* cited by examiner

| | MEASUREMENT CHAMBER | WIRE BODY | COMPARATIVE EXAMPLE | FIRST EXAMPLE | SECOND EXAMPLE | THIRD EXAMPLE | FOURTH EXAMPLE |
|---|---|---|---|---|---|---|---|
| ACOUSTIC PRESSURE (dB) | 42.5 | 79.2 | 76.3 | 73.6 | 74.4 | 74.4 | 75.8 |

WIRE, WIRE MANUFACTURING METHOD, AND VEHICLE DOOR

TECHNICAL FIELD

The present invention relates to a wire, a wire manufacturing method, and a vehicle door. In particular, the present invention relates to technology well-suited for application to a wire used to couple together mounted components in a vehicle door, a manufacturing method for this wire, and a vehicle door in which this wire is provided.

BACKGROUND ART

Japanese Patent Application Laid-Open (JP-A) No. 2010-159037 discloses a back door of a minivan type vehicle or the like. At least part of the back door is made of resin. The back door is configured including an inner panel, an outer panel provided at a vehicle rear side of the inner panel, and reinforcement provided between the inner panel and the outer panel at both vehicle width direction end portions thereof.

This back door is installed with a pair of left and right wires running along outer peripheral portions of the inner panel and the outer panel. The wires couple together metal components such as hinge retainers and lock reinforcement, and are employed as anti-scattering wires.

The back door configured in this manner enables metal components to be effectively suppressed from scattering if the back door is damaged, for example in a vehicle rear-end collision, since the metal components are coupled together by the wires.

SUMMARY OF INVENTION

Technical Problem

The wires are attached to the back door with a certain degree of slack present in order to facilitate a task to attach the wires to the back door, enabling this wire assembly task to be performed smoothly even if distortion is present in the back door. As a result, vibration, acceleration, deceleration, and the like arising during vehicle travel could result in noise generation due to the wires contacting the inner panel or the outer panel of the back door.

Accordingly, circular cylinder shaped protectors (protective members) are produced from a foamed material, and the wires are passed through the cylinder interiors of the protectors in order to produce wires in which the outer peripheries of the wires are covered by the protectors. Examples of the foamed material include ethylene propylene diene rubber (EPDM), polyvinyl chloride (PVC), and olefin-based elastomers (TPO).

However, manufacturing efficiency suffers if a small stray strand from a wire end portion catches on the protector when passing the wire through the cylinder interior of the protector during the wire production process, and attempting to force this task could damage the protector. There is accordingly room for improvement.

Alternatively, enlarging the internal diameter of the cylinder interior of the protector to allow the wire to pass more easily would result in a thinner protector, such that the rattling reduction effect would suffer. There is accordingly also room for improvement in this respect.

In consideration of the above circumstances, the present invention provides a wire, a wire manufacturing method, and a vehicle door capable of effectively suppressing or preventing damage to a protector and also having an excellent rattling reduction effect.

The present invention also provides a wire, a wire manufacturing method, and a vehicle door well-suited to automation so as to enable an improvement in manufacturing efficiency when forming a protector to a wire.

Solution to Problem

A wire according to a first aspect of the present invention includes a wire body that is made of metal, and a protector that is made of resin, that covers an outer periphery of the wire body, and that is integrally molded with the wire body.

The wire according to the first aspect includes the wire body and the protector. The wire body is made of metal. The protector is made of resin and covers the outer periphery of the wire body.

Note that the protector is integrally molded with the wire body. This eliminates the need to pass the wire body through the interior of the protector from one end, and thus enables the issue of damage to the protector caused by stray strands at an end portion of the wire body to be fundamentally eliminated.

Moreover, since there is no need to pass the wire body through the protector, the need to enlarge the internal diameter of the interior of the protector is also eliminated, thereby enabling the protector to be formed with greater thickness. Since this improves the cushioning properties of the protector, the rattling reduction effect when the wire contacts an object other than the wire can be enhanced.

A wire according to a second aspect of the present invention includes a wire body that is made of metal, and a protector that is made of resin, that covers an outer periphery of the wire body, and that is closely adhered to the wire body.

The wire according to the second aspect includes the wire body and the protector. The wire body is made of metal. The protector is made of resin and covers the outer periphery of the wire body.

Note that the protector is closely adhered to the wire body. Since the protector is closely adhered to the wire body by covering the outer periphery of the wire body without passing the wire body through the interior of the protector from one end, the issue of damage to the protector caused by stray strands at an end portion of the wire body can be fundamentally eliminated.

Moreover, since there is no need to pass the wire body through the protector, there is also no need to enlarge the internal diameter of the interior of the protector, thereby enabling the protector to be formed with greater thickness. Since this improves the cushioning properties of the protector, the rattling reduction effect when the wire contacts an object other than the wire can be enhanced.

A wire according to a third aspect of the present invention is the wire according to either the first aspect or the second aspect, wherein the protector is formed with a uniform thickness around the outer periphery of the wire body.

In the wire according to the third aspect, since the protector is formed with a uniform thickness around the outer periphery of the wire body, a uniform rattling reduction effect can be obtained regardless of the location of the outer periphery of the wire that contacts an object other than the wire.

A wire according to a fourth aspect of the present invention is the wire according to either the first aspect or the second aspect, wherein the protector has a serrated cross-section profile as viewed across a length direction of the wire body.

In the wire according to the fourth aspect, due to the cross-section profile of the protector being a serrated profile as viewed across the length direction of the wire body, plural recesses extending from the outer periphery of the protector toward the radial direction inside are formed running in the length direction of the protector. Accordingly, the amount of resin required to produce the protector can be reduced in comparison to a protector formed with a uniform thickness around the outer periphery of the wire body.

Moreover, the protector is formed with protrusions projecting from the radial inside toward the radial outside between adjacent recesses out of the plural recesses. These protrusions readily undergo deformation. This enables the cushioning properties of the protector to be improved at the protrusions, enabling the rattling reduction effect when the wire contacts an object other than the wire to be further enhanced.

A wire according to a fifth aspect of the present invention is the wire according to any one of the first aspect to the fourth aspect, wherein at least one of one end portion or another end portion of the wire body in a length direction of the wire body is exposed from the protector, and an attachment fixing section is coupled to the at least one of the one end portion or the other end portion of the wire body that is exposed.

In the wire according to the fifth aspect, the at least one of the one end portion or another end portion in the length direction of the wire body is coupled to the attachment fixing section. The attachment fixing section is coupled to the at least one of the one end portion and the other end portion of the wire body that is exposed from the protector. Coupling the attachment fixing section to the wire body enables the wire to be attached and fixed to objects other than the wire.

A wire according to a sixth aspect of the present invention is the wire according to any one of the first aspect to the fifth aspect, wherein a length direction intermediate portion of the wire body is exposed from the protector, and an intermediate bracket is retained on the length direction intermediate portion of the wire body that is exposed.

In the wire according to the sixth aspect, the intermediate bracket is retained at the length direction intermediate portion of the wire body. The intermediate bracket is retained at the length direction intermediate portion of the wire body that is exposed from the protector. Retaining the intermediate bracket on the wire body enables the length direction intermediate portion of the wire to be attached to objects other than the wire.

A wire according to a seventh aspect of the present invention is the wire according to any one of the first aspect to the sixth aspect, wherein the protector is a thermally molded body configured from a resin composition in which a matrix resin selected from the group consisting of an olefin-based thermoplastic resin and a vinyl chloride-based resin is blended with thermally expandable microcapsules including a nitrile-based thermoplastic resin membrane.

In the wire according to the seventh aspect, the protector is a thermally molded body configured from a resin composition. The resin composition is configured from the matrix resin selected from the group consisting of the olefin-based thermoplastic resin and the vinyl chloride-based resin and blended with the thermally expandable microcapsules including the nitrile-based thermoplastic resin membrane. This enables the foaming ratio to be raised in the protector, enabling sufficient softness to be obtained, and thus enabling the rattling reduction effect to be enhanced. Moreover, the protector has a high quality external appearance due to reducing the size of surface pockmarking resulting from the foaming.

A wire manufacturing method according to an eighth aspect of the present invention includes feeding a resin material in a heated state onto an outer periphery of a metal wire body by extrusion molding along a length direction of the wire body and then cooling the resin material so as to form a resin protector at the outer periphery of the wire body.

In the wire manufacturing method according to the eighth aspect, the resin material is fed in a heated state onto the outer periphery of the metal wire body by extrusion molding along the length direction of the wire body. The fed resin material is then cooled in order to form the resin protector at the outer periphery of the wire body.

This enables the issue of damage to the protector caused by stray strands at an end portion of the wire body to be fundamentally eliminated, and moreover enables a wire capable of enhancing the rattling reduction effect to be obtained.

Moreover, manufacturing efficiency can be improved since the task of passing the wire body through the interior of the protector can be eliminated. This enables a task performed by humans to be abolished, thus enabling manufacture of the wire formed with the protector to be automated.

A vehicle door according to a ninth aspect of the present invention includes a door outer panel that is at least partially made of resin, a first mounted component that is mounted to the door outer panel, a second mounted component that is mounted to the door outer panel at a different location from the first mounted component, and a wire that is attached and fixed to the first mounted component by an attachment fixing section provided at at least one of one end portion or another end portion of the wire body in a length direction, and that is attached and fixed to the second mounted component by an intermediate bracket provided at a length direction intermediate portion of the wire body. The wire is configured including the wire body that is made of metal, and a protector that is made of resin, that covers an outer periphery of the wire body, and that is integrally molded with the wire body.

The vehicle door according to the ninth aspect includes the door outer panel, the first mounted component, the second mounted component, and the wire. At least part of the door outer panel is made of resin. The first mounted component is mounted to the door outer panel. The second mounted component is mounted to the door outer panel at a different location from the first mounted component. The wire includes the wire body, and at least one of the one end portion and the other end portion of the wire body is provided with the attachment fixing section, while the intermediate bracket is provided at the length direction intermediate portion of the wire body. The attachment fixing section is attached and fixed to the first mounted component. The intermediate bracket is attached and fixed to the second mounted component.

Note that the wire is configured including the metal wire body and the resin protector integrally molded with the wire body so as to cover the outer periphery of the wire body. The vehicle door can be constructed using the wire, in which the need to pass the wire body through the interior of the protector from one end has been eliminated, thus enabling the issue of damage to the protector caused by stray strands at an end portion of the wire body to be fundamentally eliminated.

Moreover, since the need to pass the wire body through the protector is eliminated, the need to enlarge the internal diameter of the interior of the protector is also eliminated, enabling the protector to be formed with greater thickness. This enables the cushioning properties of the protector to be improved, and thus enables the vehicle door to be constructed with an enhanced rattling reduction effect when the wire contacts an object other than the wire.

Advantageous Effects of Invention

The present invention is capable of providing a wire, a wire manufacturing method, and a vehicle door capable of effectively suppressing or preventing damage to a protector and also having an excellent rattling reduction effect.

The present invention is also capable of providing a wire, a wire manufacturing method, and a vehicle door well-suited to automation so as to enable an improvement in manufacturing efficiency when forming a protector to a wire.

BRIEF DESCRIPTION OF DRAWINGS

FIG. 6 (1) is a cross-section illustrating a wire according to a first example illustrated in FIG. 1B as viewed along its length direction, (2) is a cross-section corresponding to FIG. 6 (1), illustrating a wire according to a second example, (3) is a cross-section corresponding to FIG. 6 (1), illustrating a wire according to a third example, (4) is a cross-section corresponding to FIG. 6 (1), illustrating a wire according to a fourth example, and (5) is a cross-section corresponding to FIG. 6 (1), illustrating a wire according to a comparative example.

DESCRIPTION OF EMBODIMENTS

Explanation follows regarding a wire, a wire manufacturing method, and a vehicle door according to an exemplary embodiment of the present invention, with reference to FIG. 1A to FIG. 7. In the drawings, the letter X indicates an X axis direction, the letter Y indicates a Y axis direction, and the letter Z indicates a Z axis direction as appropriate in a three-dimensional coordinate system. In the interests of simplicity, in the explanation of the wire the length direction of the wire (a cable axial direction) is considered to run in the X axis direction. Note that the directions in which the wire, the wire manufacturing method, and the vehicle door are applied are not limited to those described in the present exemplary embodiment.

Wire 10 Configuration (1) Wire Body 12 Configuration

Figure 1A:
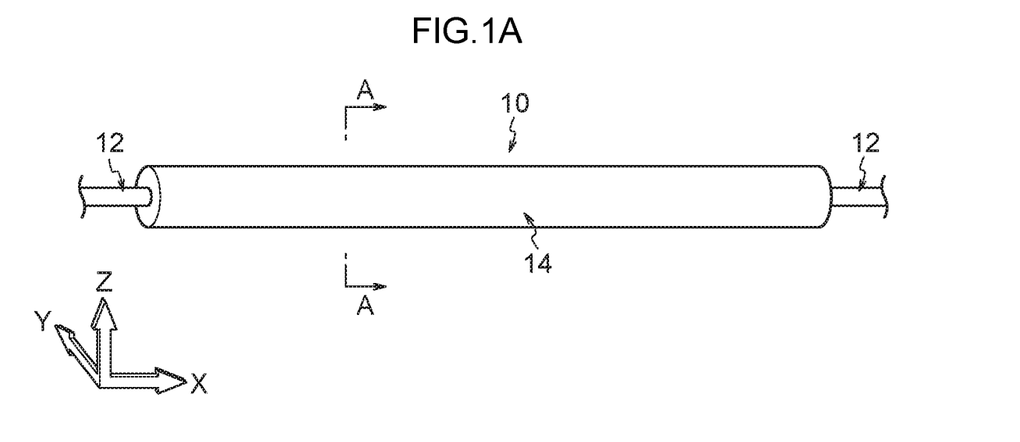
FIG. 1A is a perspective view illustrating a wire according to an exemplary embodiment of the present invention, as viewed from a radial direction outside.
Figure 1B:
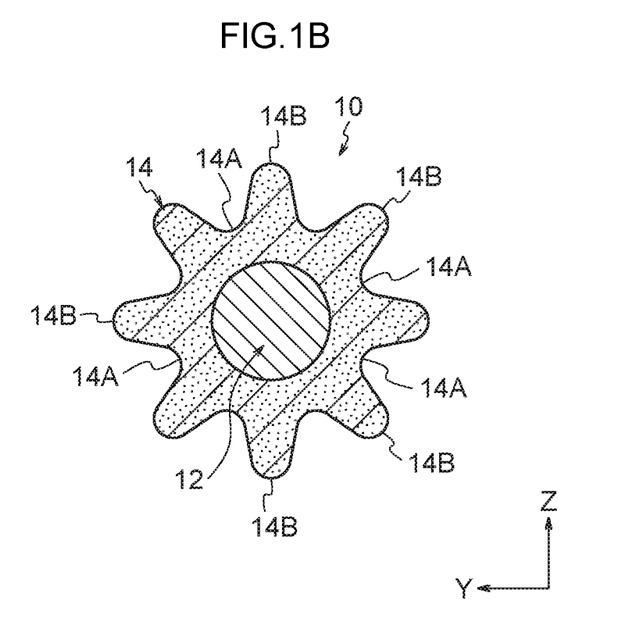
FIG. 1B is a cross-section (a cross-section as sectioned along line A-A) of the wire illustrated in FIG. 1A, as viewed along its length direction.

A wire 10 according to the present exemplary embodiment illustrated in FIG. 1A and FIG. 1B is employed as an anti-scattering wire rope. The wire 10 is configured including a wire body 12 that is made of metal and a protector (protective layer) 14 that is made of resin and that covers an outer periphery of the wire body 12.

Although not illustrated in detail, the wire body 12 is formed by twisting several to several dozen bare wires together in a single layer or multiple layers to form strands, and then twisting these strands around a core at a predetermined pitch. As illustrated in FIG. 1B, the wire body 12 has a substantially circular cross-section profile when viewed across the length direction of the wire body 12. An iron-based material, a mild steel-based material, a galvanized iron-based material, or the like may be employed in practice as the metal material of the wire body 12. Note that as an example, the diameter of the wire body 12 employed is from 2.0 mm to 3.0 mm.

(2) Protector 14 Configuration

A length direction of the protector 14 extends along the length direction of the wire body 12. As illustrated in FIG. 1B, the protector 14 is integrally molded to an outer peripheral surface of the wire body 12. In other words, the protector 14 is closely adhered to the outer peripheral surface of the wire body 12. In the present exemplary embodiment, the protector 14 is formed with a serrated cross-section profile as viewed across its length direction. This "serrated profile" refers to a grooved profile with a saw-toothed pattern. Namely, the protector 14 is formed with recesses 14A set back from the radial direction outside toward the radial direction inside at a uniform pitch around the outer periphery (peripheral direction) of the wire body 12, and is also formed with protrusions 14B projecting from the radial direction inside toward the radial direction outside between adjacent recesses 14A in a direction around the outer periphery.

The recesses 14A and the protrusions 14B each extend in a straight line and are provided so as to run parallel to the wire body 12 along the length direction of the protector 14. Note that the recesses 14A and the protrusions 14B may also extend so as to run parallel to each other along the length direction of the protector 14, while spiraling with respect to the wire body 12.

Although the number of the recesses 14A and number of the protrusions 14B disposed at the outer periphery of the wire body 12 are not particularly limited, at least three of each are provided. In this example, eight of each of the recesses 14A and protrusions 14B are provided in order to reduce the amount of resin employed in the production of the protector 14, while furnishing the protrusions 14B with appropriate cushioning properties.

In the present exemplary embodiment, each of the recesses 14A is formed with a U-shaped cross-section profile, and each of the protrusions 14B is formed with an inverted U-shaped cross-section profile. Note that the recesses 14A may alternatively be formed with V-shaped cross-section profiles, rectangular cross-section profiles, or trapezoidal cross-section profiles, while the protrusions 14B may be formed with inverted V-shaped cross-section profiles, rectangular cross-section profiles, or inverted trapezoidal cross-section profiles.

Moreover, in the present exemplary embodiment the height from a bottom face on the wire body 12 side of the protector 14 to the outermost sides of the protrusions 14B (the maximum thickness of the protector 14) is, for example, set to from 1.65 mm to 2.25 mm. Moreover, a dimension from the outermost side of the protrusions 14B to the innermost side of the recesses 14A of the protector 14 (the maximum depth of the recesses 14A) is, for example, set to from 0.2 mm to 0.4 mm.

The protector 14 is formed by a thermally molded body employing a resin composition in which a matrix resin selected from the group consisting of olefin-based thermoplastic resins and vinyl chloride-based resins is blended with thermally expandable microcapsules including a nitrile-based thermoplastic resin membrane.

The matrix resin is a resin that supports a foamed structure formed by foaming the thermally expandable microcapsules that include the nitrile-based thermoplastic resin membrane.

The olefin-based thermoplastic resin is a material that has a glass transition point of room temperature or lower, and that is flexible at room temperature. The A hardness thereof is set in a range of from 30 to 70. So-called olefinic thermoplastic elastomers (TPO) are soft resins, and therefore make preferable candidates for the olefin-based thermoplastic resin. The hard phase of such resins is configured by the polyolefin-based resin polypropylene, and the soft phase of such resins is a non-crystalline phase configured by a rubber or a copolymer of an ethylene-α-olefin (such as propylene).

Moreover, a so-called reactor-TPO, in which a non-crystalline ethylene-propylene copolymer is mixed into a propylene polymer, may be employed as the olefin-based thermoplastic resin. Copolymers such as ethylene with 1-butene, 1-octene, or the like may be employed either individually or mixed with polypropylene as the olefin-based thermoplastic resin. Furthermore, a hydrogenated styrene-butadiene resin or a hydrogenated styrene-isoprene resin mixed with polypropylene may also be employed as the olefin-based thermoplastic resin. Such resins are soft, and enable an improved foaming ratio.

For example, soft polyvinyl chloride blended with a plasticizer such as dioctyl phthalate (DOP) or diisononyl phthalate (DINP) may be employed as the vinyl chloride-based resin. Setting the degree of polymerization to around 1000 to 4000, and in particular setting the degree of polymerization within a range of from 2000 to 4000, enables both the foaming ratio and recovery properties to be improved.

Alternatively, a vinyl chloride resin blended with a solid soft component such as nitrile rubber or a urethane elastomer may be employed instead of a liquid plasticizer.

Thermally expandable microcapsules are generally configured including a thermoplastic resin membrane (outer shell) and an encapsulated component that is encapsulated within the thermoplastic resin membrane and that vaporizes when heated. In this case thermally expandable microcapsules (nitrile-based thermally expandable microcapsules) including a nitrile-based thermoplastic resin membrane obtained by polymerizing a polymerizable component containing a nitrile-based monomer are employed therefor.

Thermoplastic resins are generally obtained by polymerizing a polymerizable component. The polymerizable component includes a monomer component containing one ethylenically unsaturated bond as an essential component, and may be a component including a polymerizable monomer (cross-linking agent) containing two or more ethylenically unsaturated bonds.

The nitrile-based monomer is one type of monomer component, and there is no particular limitation thereto as long as the monomer contains a nitrile group. A nitrile-based monomer such as, for example, acrylonitrile, methacrylonitrile, or fumaronitrile may be employed in practice therefor.

As well as nitrile-based monomers, examples of the monomer component include vinyl halogen-based monomers such as vinyl chloride; vinylidene halogen-based monomers such as vinylidene chloride; vinylester-based monomers such as vinyl acetate, vinyl propionate, and vinyl butyrate; and (meth)acrylic acid ester-based monomers such as methyl(meth)acrylate, ethyl(meth)acrylate, n-butyl(meth)acrylate, t-butyl(meth)acrylate, 2-ethylhexyl(meth)acrylate, stearyl(meth)acrylate, phenyl(meth)acrylate, isobornyl (meth)acrylate, cyclohexyl(meth)acrylate, and benzyl(meth)acrylate, 2-hydroxyethyl(meth)acrylate. Note that (meth)acrylate means acrylate or methacrylate and (meth)acrylic means acrylic or methacrylic.

The nitrile-based thermoplastic resin membrane has as an essential component a nitrile-based monomer, this being one type of monomer component, and may be obtained by polymerizing a polymerizable component containing a cross-linking agent (preferably in the presence of a polymerization initiator). In order to improve the gas barrier properties of the nitrile-based thermoplastic resin membrane, the proportion of the nitrile-based monomer in the polymerizable component by mass is set to at least 95 mass %, and preferably to at least 98 mass %. When the proportion of the nitrile-based monomer is at least 95 mass %, the thermoplastic resin that forms the nitrile-based thermoplastic resin membrane has very high gas barrier properties.

Accordingly, the encapsulated component can be reliably prevented from leaking into the matrix resin and collecting so as to form voids when the protector 14 is being formed by extrusion molding, thereby reliably preventing resin starving that is detrimental to surface properties. Note that the upper limit to the proportion of the nitrile-based monomer in the polymerizable component by mass is 100 mass %.

In addition to the nitrile-based monomer, the polymerizable component of the nitrile-based thermoplastic resin membrane may include a polymerizable monomer (cross-linking agent) including two or more polymerizable double bonds. Employing a cross-linking agent during polymerization enables the retention ratio (encapsulated retention ratio) of the encapsulated component encapsulated within the nitrile-based thermoplastic resin membrane to be suppressed from decreasing during thermal expansion, thereby enabling thermal expansion to be performed effectively.

Although not particularly limited, examples of the cross-linking agent include compounds such as ethylene glycol di(meth)acrylate, diethylene glycol di(meth)acrylate, 1,9-nonane diol di(meth)acrylate, PEG 200 di(meth)acrylate, PEG 600 di(meth)acrylate, trimethylolpropane tri(meth)acrylate, pentaerythritol tri(meth)acrylate, and dipentaerythritol hexa(meth)acrylate. These cross-linking agents may be employed singly or in a combination of two or more types thereof.

Although the blending amount of the cross-linking agent is not particularly limited, the proportion of the cross-linking agent in the polymerizable component by mass is set to from 0.01 mass % to 5 mass %, is preferably set to from 0.1 mass % to 1 mass %, and is more preferably set to from 0.15 mass % to 0.8 mass %.

Note that although the method of manufacturing the nitrile-based thermally expandable microcapsules is not limited, a manufacturing method employing an oily mixture containing a polymerization initiator is employed here to cause polymerization of the polymerizable component in the presence of the polymerization initiator. A peroxide compound, an azo compound, or the like may be employed, for example, as the polymerization initiator.

Examples of compounds that may be employed as the peroxide compound include a peroxydicarbonate such as diisopropylperoxydicarbonate, di-sec-butylperoxydicarbonate, and di-2-ethylhexylperoxydicarbonate; a peroxyester such as t-butylperoxypivalate, and t-hexylperoxypivalate; and a diacylperoxide such as caproylperoxide, lauroylperoxide, stearoylperoxide, and benzoylperoxide.

Examples of compounds that may be employed as the azo compound include 2,2'-azobis(4-methoxy-2,4-dimethyl-valeronitrile), 2,2'-azobisisobutyronitrile, 2,2'-azobis(2,4-dimethylvaleronitrile), 2,2'-azobis(2-methylpropionate), and 2,2'-azobis(2-methylbutyronitrile).

Among polymerization initiators, a peroxydicarbonate is preferable.

These polymerization initiators may be employed singly or in a combination of two or more types thereof. An oily polymerization initiator soluble in the polymerizable component is preferably employed as the polymerization initiator. Although the blending amount of the polymerization initiator it not particularly limited, it is set to from 0.3 parts by mass to 8.0 parts by mass with respect to 100 parts by mass of the polymerizable component.

Although the encapsulated component (vaporizing component) encapsulated within the thermally expandable microcapsules is not particularly limited as long as it is a compound that vaporizes when heated, the encapsulated component is preferably configured from a mixture of isopentane and isohexane and isooctane.

Although not particularly limited, the proportion of isopentane in the total encapsulated component by mass is set to from 10 mass % to 50 mass %, is preferably set to from 20 mass % to 45 mass %, and is more preferably set to from 30 mass % to 40 mass %.

Although not particularly limited, the proportion of isohexane in the total encapsulated component by mass is set to from 10 mass % to 50 mass %, is preferably set to from 10 mass % to 30 mass %, and is more preferably set to from 15 mass % to 25 mass %.

Although not particularly limited, the proportion of isooctane in the total encapsulated component by mass is set to from 20 mass % to 50 mass %, is preferably set to from 30 mass % to 49 mass %, and is more preferably set to from 40 mass % to 48 mass %.

Although not particularly limited, the proportion of the encapsulated component in the total thermally expandable microcapsules by mass is set to from 5 mass % to 30 mass %, is preferably set to from 10 mass % to 25 mass %, and is more preferably set to from 15 mass % to 20 mass %.

If the proportion by mass is less than 5 mass %, the expansion force is diminished, and the amount of additives to the thermally expandable microcapsules sometimes needs to be increased in order to obtain the desired specific weight or foaming ratio. On the other hand, if the proportion by mass is greater than 30 mass %, then leakage of the encapsulated component from the thermally expandable microcapsules during extrusion molding of the protector 14 sometimes increases and causes numerous voids to be generated within a resin layer or at the surface of the protector 14.

Although not particularly limited, the mean particle size of the nitrile-based thermally expandable microcapsules is set to from 15 μm to 25 μm, and is preferably set to from 17 μm to 23 μm. The expansion force is diminished if the mean particle size is smaller than 15 μm, and sometimes a larger amount of additives is needed in order to obtain the desired specific weight or foaming ratio. On the other hand, the surface properties of the protector 14 may not be satisfactory if the mean particle size is larger than 25 μm.

Commercially available nitrile-based thermally expandable microcapsules may be employed as the thermally expandable microcapsules.

The nitrile-based thermally expandable microcapsules of the protector 14 of the present exemplary embodiment are heated, causing the encapsulated component to vaporize and expand, such that the structure of the protector 14 is one in which bubbles having a nitrile-based resin membrane configuring the thermally expandable microcapsules are dispersed within the matrix resin. Too small a bubble size sometimes results in insufficient the rattling reduction effect. On the other hand, too large a bubble size is sometimes detrimental to the external appearance of the protector 14. Accordingly, the mean bubble size in the protector 14 is set in a range of from 60 μm to 180 μm, and is preferably set in a range of from 80 μm to 110 μm.

Too low a foaming ratio sometimes results in insufficient rattling reduction effect. Too high a foaming ratio is sometimes detrimental to the external appearance of the protector 14. The foaming ratio is set here in a range of from 1.3 times to 3.5 times, and is preferably set in a range of from 2.0 times to 3.0 times.

Attachment Fixing Section 20 and Intermediate Bracket 30 Configuration

Figure 2A:
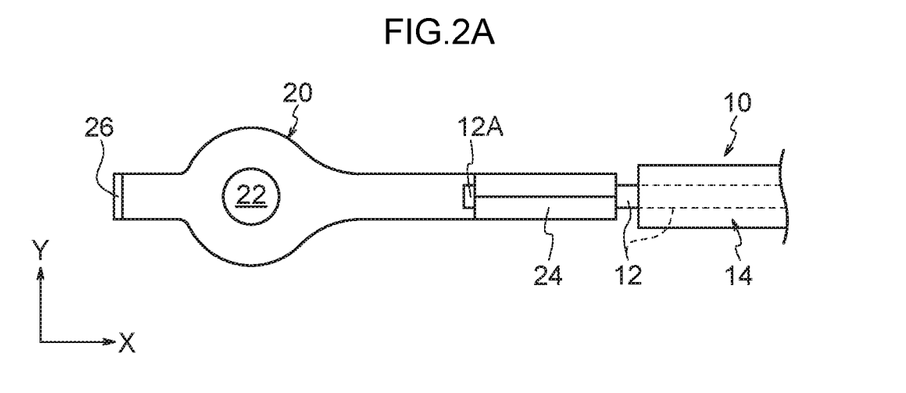
FIG. 2A is a front view illustrating an end portion of the wire illustrated in FIG. 1A and an attachment fixing section coupled to this end portion.

As illustrated in FIG. 2A, in the wire 10 according to the present exemplary embodiment one length direction end portion 12A of the wire body 12 is exposed from the protector 14, and an attachment fixing section 20 is coupled to this exposed one end portion 12A. The one end portion 12A is exposed by removing the protector 14.

Although not illustrated in the drawings, similarly to the one end portion 12A, another length direction end portion of the wire body 12 is also exposed from the protector 14, and an attachment fixing section configured similarly to the attachment fixing section 20 is coupled to the exposed other end portion. Note that explanation will be given regarding the attachment fixing section 20 coupled to the one end portion 12A, while duplicate explanation regarding the attachment fixing section coupled to the other end portion will be omitted. Note that the attachment fixing section need not always be provided at the other end portion of the wire body 12.

Figure 2B:
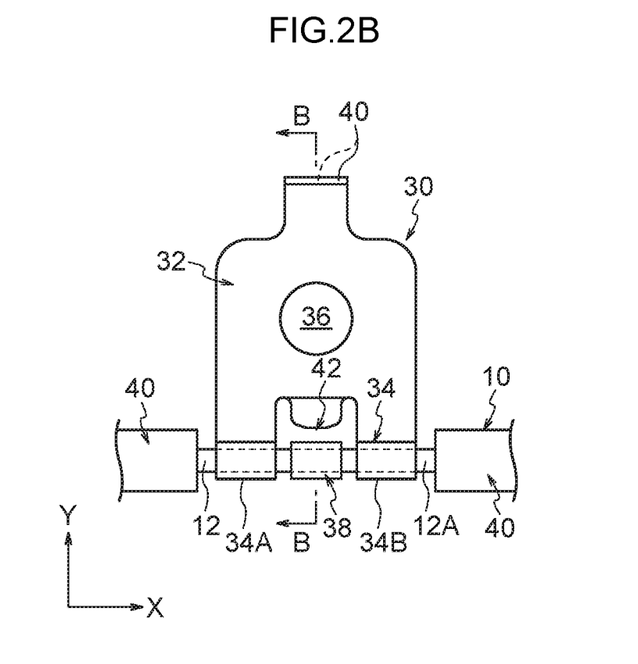
FIG. 2B is a front view illustrating a length direction intermediate portion of the wire illustrated in FIG. 1A and an intermediate bracket retained at this intermediate portion.

As illustrated in FIG. 2B, one intermediate bracket 30, or plural intermediate brackets 30 arranged at predetermined intervals, are retained at a length direction intermediate portion of the wire body 12 of the wire 10 according to the present exemplary embodiment. In this example, three of the intermediate brackets 30 are retained at substantially equal intervals along the length direction intermediate portion of the wire body 12 of a single wire 10.

(1) Attachment Fixing Section 20 Configuration

Returning to FIG. 1A, the attachment fixing section 20 is formed in a plate shape disposed with its length direction running in the X direction so as to align with the length direction of the wire body 12, and its short direction in the Y direction.

An attachment hole 22 formed as a circular opening is provided penetrating a length direction intermediate portion of the attachment fixing section 20 in its plate thickness direction. A location of the attachment fixing section 20 corresponding to the attachment hole 22 is set with a greater short direction dimension than other locations of the attachment fixing section 20 in order to accommodate the attachment hole 22.

A coupling fixing section 24 is provided at one end portion, namely on the wire body 12 side, of the attachment fixing section 20. As viewed along the X direction, the coupling fixing section 24 is molded toward the left and toward the right around the outer periphery of the one end portion 12A of the wire body 12, and the coupling fixing section 24 is fixed to the one end portion 12A by crimping.

An anti-rotation section 26 is provided at the other end portion of the attachment fixing section 20, namely on the opposite side of the attachment fixing section 20 to the wire body 12. The anti-rotation section 26 is formed extending out from the vicinity of the attachment hole 22 in the opposite direction to the X direction, and a leading end portion of this extension is locally bent toward the Z direction. The anti-rotation section 26 is formed in an L-shape as viewed along the Y direction. The anti-rotation section 26 is configured to prevent the attachment fixing section 20 from rotating when fastening a fastening member through the attachment hole 22. For example, a nut and bolt are employed as such a fastening member.

The attachment fixing section 20 is, for example, formed from a galvanized steel plate.

(2) Intermediate Bracket 30 Configuration

Figure 2C:
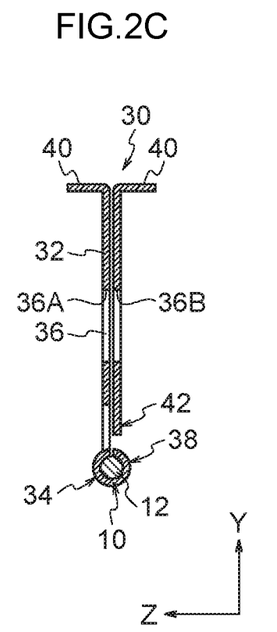
FIG. 2C is a cross-section (a cross-section as sectioned along line B-B) of the intermediate bracket illustrated in FIG. 2B.

As illustrated in FIG. 2B and FIG. 2C, each of the intermediate brackets 30 includes a bracket body 32, a wire-retained section 34, an attachment hole 36, and a stopper 38. Each of the intermediate brackets 30 is further provided with anti-rotation sections 40.

The bracket body 32 is formed in a plate shape extending in the Y direction and the X direction, and is formed in a substantially rectangular shape with its length direction in the Y direction and its short direction in the X direction as viewed along the plate thickness direction (Z direction) after a molding process.

In the present exemplary embodiment, the bracket body 32 is formed from a galvanized steel plate similarly to the attachment fixing section 20. Galvanized steel plate is a material that has high mechanical strength, excellent machinability, does not rust easily, and is low in cost. Although not particularly limited, the bracket body 32 is, for example, set with a plate thickness in a range of from 0.8 mm to 1.6 mm. The Y direction length of the bracket body 32 is, for example, set in a range of from 45 mm to 50 mm, and the X direction length of the bracket body 32 is, for example, set in a range of from 15 mm to 25 mm.

The wire-retained section 34 is provided at one Y direction end portion of the bracket body 32 (a lower end portion in the Y direction in FIG. 2B) and runs in the X direction. The wire-retained section 34 is configured including a wire-retained portion 34A provided at one X direction end portion (on the left side in FIG. 2B) and a wire-retained portion 34B provided at another X direction end portion (on the right side in FIG. 2B). Namely, the wire-retained portion 34A and the wire-retained portion 34B configure two wire-retained portions arranged in the X direction. The wire-retained portion 34A and the wire-retained portion 34B each have an X direction length set in a range of, for example, from 5 mm to 7 mm.

As illustrated in FIG. 2B, the wire-retained section 34 is retained on the wire body 12 from which the protector 14 of the wire 10 has been removed, the length direction of the wire 10 being aligned with the X direction. In this example, as illustrated in FIG. 2B and FIG. 2C, the wire-retained section 34 is molded around the outer periphery of the wire body 12, and as viewed along the X direction, the wire-retained section 34 has a circular cylinder shaped cross-section that is locally notched so as to form a C-shaped cross-section profile. The wire-retained section 34 is retained so as to be capable of rotating about the wire body 12 and is also retained so as to be capable of moving in the length direction of the wire body 12. Namely, the wire-retained section 34 is capable of moving relative to the wire body 12.

The attachment hole 36 is formed through a Y direction intermediate portion and an X direction intermediate portion of the bracket body 32. As illustrated in FIG. 2C, the attachment hole 36 is configured by an attachment hole 36A and an attachment hole 36B formed at respective locations of the bracket body 32 that are superimposed on each other by bending the bracket body 32 about the location of the wire-retained section 34 in the Y direction, thereby placing the attachment hole 36A and the attachment hole 36B in communication with each other.

The attachment hole 36A and the attachment hole 36B are both through holes formed penetrating the bracket body 32 in its plate thickness direction, and are formed with circular opening profiles in this example. The opening dimensions (diameter dimensions) of both the attachment hole 36A and the attachment hole 36B are, for example, set in a range of from 6.0 mm to 6.5 mm.

As illustrated in FIG. 2B and FIG. 2C, a pair of the anti-rotation sections 40 are formed at a Y direction uppermost end portion and X direction intermediate portion of the bracket body 32. The pair of anti-rotation sections 40 are integrally formed to the bracket body 32.

One of the anti-rotation sections 40 is provided at the Y direction uppermost end portion of the bracket body 32, and is formed extending out upward, with an uppermost end portion of the extension being locally bent toward the Z direction. As illustrated in FIG. 2C, the one anti-rotation section 40 is formed with an L-shaped cross-section profile.

The other of the anti-rotation sections 40 is provided at the Y direction uppermost end portion of the bracket body 32 similarly to the one anti-rotation section 40, and is formed extending out upward, with an uppermost end portion of the extension being locally bent in the opposite direction to the Z direction. As illustrated in FIG. 2C, the other anti-rotation section 40 is formed with a backward L-shaped cross-section profile with line symmetry to the one anti-rotation section 40.

The bent location of at least one of the pair of anti-rotation sections 40 is configured to engage with a non-illustrated engagement hole provided in a mounted component (first mounted components 60, or second mounted components 62 or 64 (see FIG. 3)), described later. The intermediate bracket 30 is attached and fixed to the corresponding mounted component by fastening a fastening member through the attachment hole 36. The anti-rotation sections 40 are configured to prevent the intermediate bracket 30 from rotating during fastening of the fastening member.

As illustrated in FIG. 2B and FIG. 2C, the stopper 38 is provided at another X direction portion of the Y direction lower end portion of the bracket body 32. Note that since the wire-retained section 34 is provided at the bracket body 32 in two parts, namely as the wire-retained portion 34A and the wire-retained portion 34B, a single stopper 38 is provided between the wire-retained portion 34A and the wire-retained portion 34B. The stopper 38 is molded around the outer periphery of the wire body 12, and as viewed along the X direction is formed in a circular cylinder shape locally notched along the X direction at its outer periphery. Namely, the stopper 38 is formed with a C-shaped cross-section profile (a cross-section profile sectioned along line B-B).

The stopper 38 is integrally formed to the bracket body 32 via a cut-away region 42 prior to the molding process, and is cut away from the bracket body 32 at the cut-away region 42 after the molding process. In this example, the length of the stopper 38 around the outer periphery of the wire body 12 is, for example, set in a range of from 9 mm to 12 mm, and an X direction dimension of the stopper 38 is set in a range of from 4 mm to 6 mm.

The stopper 38 is crimped to the wire body 12, thereby fixing the stopper 38 to the wire body 12. Crimping the stopper 38 to the wire body 12 restricts rotation of the stopper 38 about the wire body 12, and also restricts movement of the stopper 38 in the length direction of the wire body 12.

The stopper 38 configured in this manner is fixed to the wire body 12 between the wire-retained portion 34A and the wire-retained portion 34B of the bracket body 32, thus enabling movement of the bracket body 32 in the X direction with respect to the wire body 12 to be restricted. Namely, the stopper 38 determines the retention position of the intermediate bracket 30 at the X direction intermediate portion of the wire body 12, and the stopper 38 enables movement of the intermediate bracket 30 in the X direction with respect to the wire body 12 to be restricted.

Vehicle Door 50 Configuration

Figure 3:
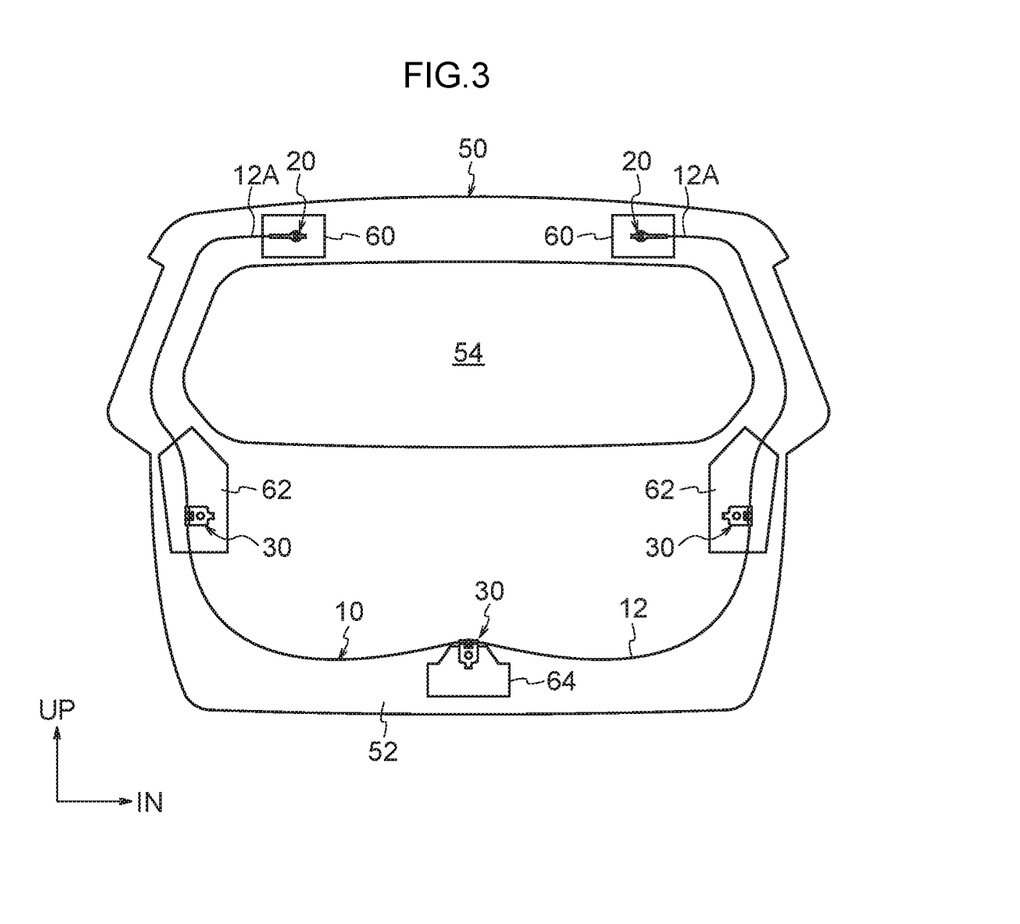
FIG. 3 is a view of a back face of an outer panel of a vehicle door (back door) according to an exemplary embodiment, mounted with a wire including attachment fixing sections and intermediate brackets, as viewed from a vehicle front side toward a vehicle rear side.

As illustrated in FIG. 3, a vehicle door 50 according to the present exemplary embodiment is employed as a back door of a minivan type vehicle, a hatchback vehicle, or the like. The vehicle door 50 includes a door outer panel 52 that is at least partially made of resin, and a door inner panel, not illustrated in the drawings, that is joined to the door outer panel 52 at a vehicle front side of the door outer panel 52 in order to construct the back door. Reinforcement, serving as a non-illustrated framework member, is provided between the door outer panel 52 and the door inner panel.

Making the vehicle door 50 from resin enables a reduction in weight of both the vehicle door 50 and the vehicle applied with the vehicle door 50. The reduction in weight of the vehicle door 50 enables the maneuverability of the vehicle door 50 to be improved.

Note that in FIG. 3, IN indicates a vehicle width direction inner side of the vehicle, and UP indicates a vehicle upper side of the vehicle. Out of the page corresponds to a vehicle front side, and into the page corresponds to a vehicle rear side when the vehicle door 50 is in a closed state. Note that the X direction, the Y direction, and the Z direction employed as appropriate in FIG. 1A and so on are not aligned with the vehicle width direction, the vehicle up-down direction, or the vehicle front-rear direction described with reference to FIG. 3.

As illustrated in FIG. 3, the door outer panel 52 has a length direction running in the vehicle width direction and a short direction running in the vehicle up-down direction, and the door outer panel 52 is made from resin and has a plate thickness direction running in the vehicle front-rear direction. A window opening 54 fitted with rear window glass is provided toward the vehicle upper side.

The first mounted components 60, the second mounted components 62, and the second mounted component 64 are mounted to an inner wall on the vehicle front side of the door outer panel 52. The first mounted components 60, the second mounted components 62, and the second mounted component 64 are all metal components, and are mounted and fixed to the door outer panel 52 using fastening components such as nuts and bolts.

To explain this in more detail, the first mounted components 60 are a pair of door hinge retainers provided at both vehicle width direction end portions of the door outer panel 52 above the window opening 54. Door hinges are provided at the door hinge retainers, and the door hinges allow the vehicle door 50 to rotate in upward and downward directions so as to open and close a door opening.

The second mounted components 62 are a pair of lamp unit retainers provided at different locations from the first mounted components 60, namely at both vehicle width direction end portions of the door outer panel 52 below the window opening 54. Tail lamp units are mounted to the lamp unit retainers. The second mounted component 64 is a lock reinforcement, likewise provided at a different location from the first mounted components 60, namely at a vehicle width direction intermediate portion of a lower end portion of the door outer panel 52.

The wire 10 illustrated in FIG. 1A and FIG. 1B that is provided with the attachment fixing sections 20 and the intermediate brackets 30 illustrated in FIG. 2A to FIG. 2C is attached to the vehicle door 50 configured as described above.

To explain this in more detail, as illustrated in FIG. 3, the attachment fixing sections 20 (at the one end portion 12A and the other end portion of the wire body 12) of the wire 10 are attached and fixed to the respective first mounted components 60. Although not illustrated in the drawings, the attachment fixing sections 20 and the corresponding first mounted components 60 are fastened together by fastening members.

The three intermediate brackets 30 are retained at substantially equal intervals along the length direction intermediate portion of the wire body 12 of the wire 10. Each of the intermediate brackets 30 is positioned by the corresponding stopper 38 as illustrated in FIG. 2B. Two of the intermediate brackets 30, respectively positioned on either vehicle width direction side, are attached and fixed to the pair of second mounted components 62. The intermediate brackets 30 and the second mounted components 62 are fastened together by fastening members. One of the intermediate brackets 30, positioned at a vehicle width direction central portion, is attached and fixed to the second mounted component 64. The intermediate bracket 30 and the second mounted component 64 are likewise fastened together by a fastening member.

Wire Manufacturing Method

Figure 4:
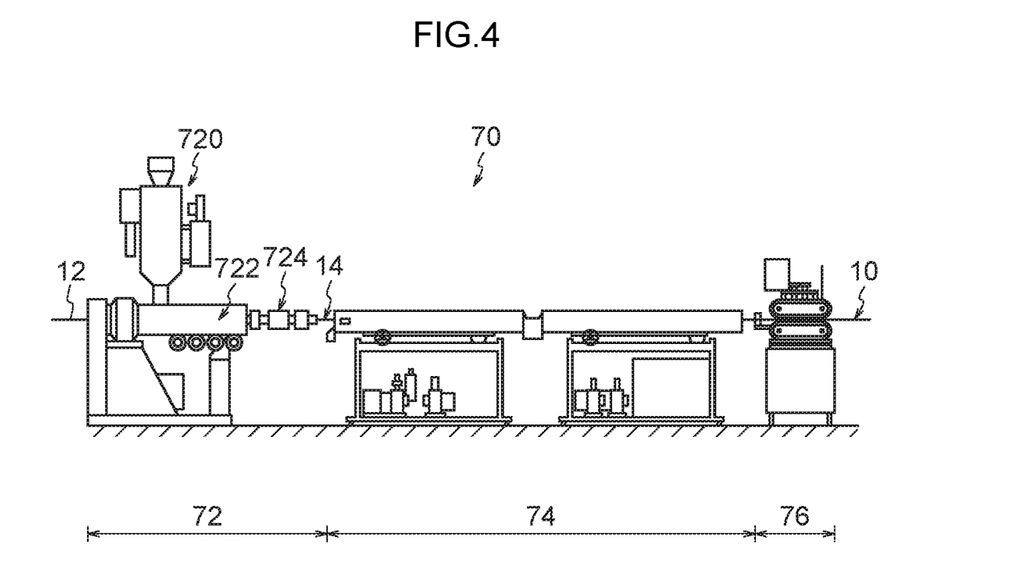
FIG. 4 is a schematic configuration diagram illustrating a molding apparatus used to manufacture the wire illustrated in FIG. 1A and FIG. 1B.

The wire 10 according to the present exemplary embodiment described above is produced using a molding apparatus 70, illustrated in FIG. 4. The molding apparatus 70 is configured including an extrusion molding section 72, a cooling water tank section 74, and a take-up and cutting section 76.

The wire body 12 is fed from the left (corresponding to a feed upstream side) toward the right (corresponding to a feed downstream side) in FIG. 4, and the wire 10 is produced by molding the protector 14 so as to cover the outer periphery of the wire body 12 during this feeding process.

To explain this in slightly more detail, the extrusion molding section 72 is configured including a resin reserve 720, a resin feeder 722, and a resin molding section 724. A resin composition used to mold the protector 14 is stored in a solid state in the resin reserve 720.

When the resin composition stored in the resin reserve 720 is fed by the resin feeder 722, the resin composition is compressed (or heated) and transitions from the solid state to a liquid (molten) state.

Figure 5:
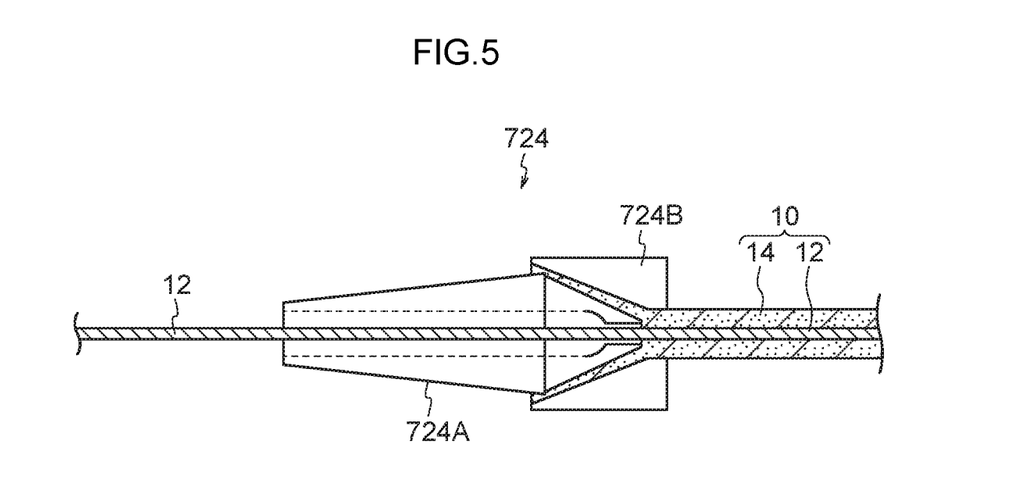
FIG. 5 is an enlarged schematic configuration diagram illustrating an extrusion molding section of the molding apparatus illustrated in FIG. 4.
Figure 6:
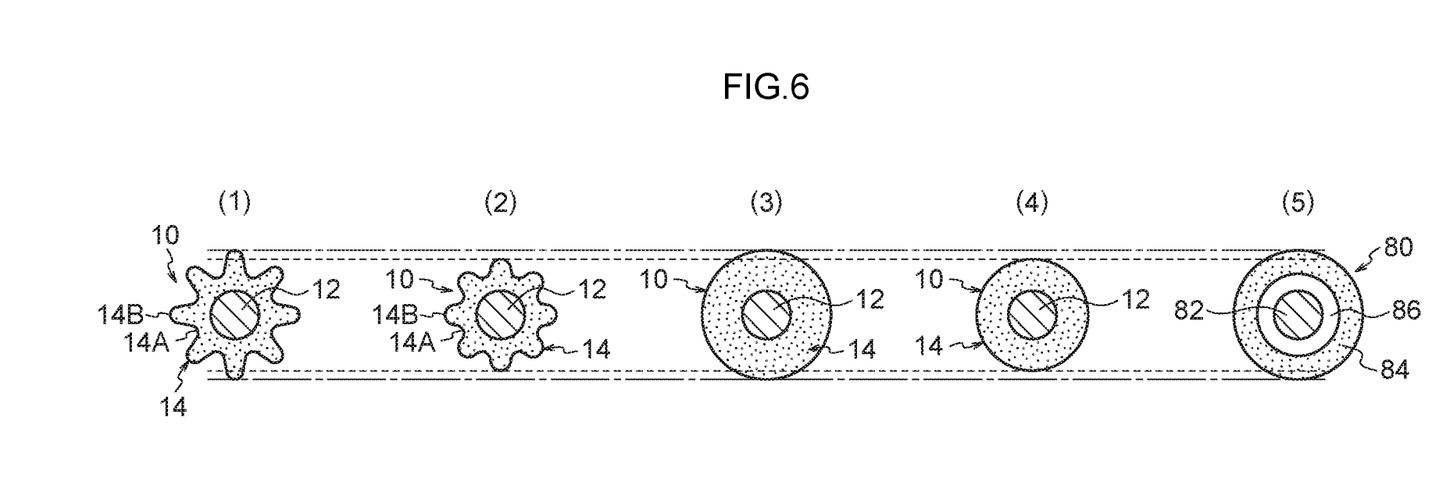

As illustrated in FIG. 5, the resin molding section 724 is configured including a feed guide 724A for the wire body 12 and a mold section 724B coupled to a feed downstream side of the feed guide 724A. Namely, configuration is made such that the resin composition in a liquid state is extrusion molded from the mold section 724B onto the outer periphery of the wire body 12 fed through the feed guide 724A to configure a thermally molded body along the length direction of the wire body 12.

Returning to FIG. 4, the resin composition extrusion molded onto the outer periphery of the wire body 12 is cooled by cooling water in the cooling water tank section 74. The cooling water tank section 74 enables the solidified protector 14 to be formed from the resin composition at the outer periphery of the wire body 12. The protector 14 is thus integrally molded to the outer periphery of the wire body 12. This protector 14 is formed in order to produce the wire 10 according to the present exemplary embodiment.

The take-up and cutting section 76 takes up the wire 10 and cuts the produced wire 10 into predetermined lengths.

Operation and Advantageous Effects of the Present Exemplary Embodiment

As illustrated in FIG. 1A and FIG. 1B, the wire 10 according to the present exemplary embodiment includes the wire body 12 and the protector 14. The wire body 12 is made of metal. The protector 14 covers the outer periphery of the wire body 12 and is made of resin.

Note that the protector 14 is integrally molded with the wire body 12. This eliminates the need to pass the wire body 12 through the protector 14 interior from one end, and thus enables the issue of damage to the protector 14 caused by stray strands at the end portion of the wire body 12 to be fundamentally eliminated.

Since there is no need to pass the wire body 12 through the protector 14, the need to enlarge the internal diameter of the protector 14 interior is also eliminated, thereby enabling the protector 14 to be formed with greater thickness. Since this improves the cushioning properties of the protector 14, the rattling reduction effect when the wire 10 contacts an object other than the wire 10, such as the door outer panel 52 (see FIG. 3) of the vehicle door 50, during vehicle travel can be enhanced.

FIG. 6 (1) illustrates a first example of a wire 10 having the same cross-section profile as the wire 10 according to the present exemplary embodiment illustrated in FIG. 1B. FIG. 6 (5) illustrates a cross-section profile of a wire 80 according to a comparative example. The wire 80 according to the comparative example is configured by passing a wire body 82 having the same configuration as the wire body 12 of the wire 10 according to the first example through the interior of a circular cylinder shaped protector 84. The protector 84 is formed by molding separately to the wire body 82. A clearance 86 is provided between the outer periphery of the wire body 82 and an inner wall of the protector 84. The clearance 86 allows the wire body 82 to pass more easily through the interior of the protector 84.

Figure 7:
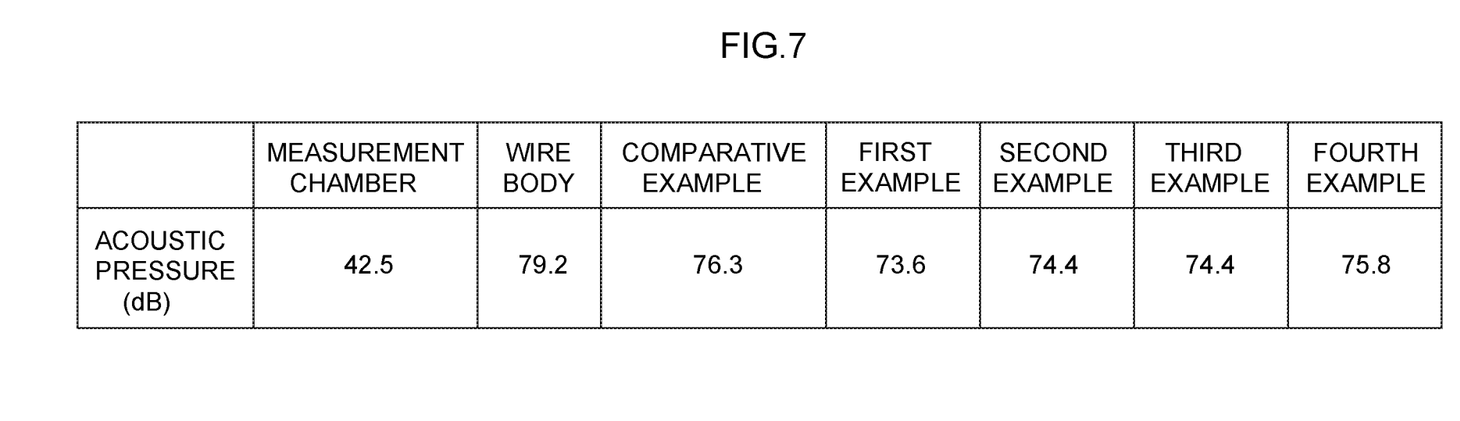
FIG. 7 is a diagram (table) illustrating results of measuring rattling of the respective wires of the first example illustrated in FIG. 6 (1) to the fourth example illustrated in FIG. 6 (4), and the wire according to the comparative example illustrated in FIG. 6 (5).

FIG. 7 illustrates rattling measurement results for the wire 10 according to the first example and the wire 80 according to the comparative example. Rattling is measured by supporting one end portion of a wire of a given length, striking a target at the other end portion of the wire at a given rotation speed centered on the one end portion, and measuring the accompanying acoustic pressure generated.

Note that the acoustic pressure in a measuring chamber was 42.5 dB, and the rattling measurement results for the wire bodies 12, 82 when not provided with the protectors 14, 84 were 79.2 dB.

The rattling measurement result for the wire 80 according to the comparative example illustrated in FIG. 6 (5) was 76.3 dB, whereas the rattling measurement result for the wire 10 according to the first example illustrated in FIG. 6 (1) was 73.6 dB. Namely, the rattling reduction effect of the wire 10 according to the first example is superior to that of the wire 80 according to the comparative example.

In other words, in the wire 10 according to the present exemplary embodiment, the protector 14 is closely adhered to the wire body 12 as illustrated in FIG. 1A and FIG. 1B. Since the protector 14 is closely adhered to the wire body 12 by covering the outer periphery of the wire body 12, without passing the wire body 12 through the interior of the protector 14 from one end, the issue of damage to the protector 14 caused by stray strands at the end portion of the wire body 12 can be fundamentally eliminated.

Moreover, since there is no need to pass the wire body 12 through the protector 14, there is also no need to enlarge the internal diameter of the interior of the protector 14, thus enabling the protector 14 to be formed with greater thickness. Since this improves the cushioning properties of the protector 14, the rattling reduction effect when the wire 10 contacts an object other than the wire 10 can be enhanced.

FIG. 6 (3) illustrates a wire 10 according to a third example, and FIG. 6 (4) illustrates a wire 10 according to a fourth example. In both the wire 10 according to the third example and the wire 10 according to the fourth example, instead of having a serrated profile the protector 14 is formed with a cross-section profile having a uniform thickness around the outer periphery of the wire body 12. The thickness of the protector 14 of the wire 10 according to the fourth example is formed thinner than the thickness of the protector 14 of the wire 10 according to the third example. However, since the clearance 86 is not required, the thickness of the protectors 14 of the wires 10 of both the third example and the fourth example can still be formed thicker than the thickness of the protector 84 of the wire 80 according to the comparative example.

As illustrated in FIG. 7, the rattling measurement result for the wire 10 according to the third example was 74.4 dB, and the rattling measurement result for the wire 10 according to the fourth example was 75.8 dB. In both cases, the results were lower than the rattling measurement result for the wire 80 according to the comparative example.

Even when the protector 14 is formed with a uniform thickness around the outer periphery of the wire body 12, as in the wires 10 according to both the third example and the fourth example of the present exemplary embodiment, a rattling reduction effect can still be obtained.

Moreover, in the wires 10 according to both the third example and the fourth example, since the protector 14 is formed with a uniform thickness around the outer periphery of the wire body 12, a uniform rattling reduction effect can be obtained regardless of the location of the outer periphery of the wire 10 that contacts an object other than the wire 10.

Moreover, in the wire 10 according to the present exemplary embodiment, due to the cross-section profile of the protector 14 being a serrated profile as viewed across the length direction of the wire body 12 as illustrated in FIGS. 1B and 1n FIG. 6 (1), the plural recesses 14A extending from the outer periphery of the protector 14 toward the radial direction inside are formed running in the length direction of the protector 14.

Accordingly, the amount of resin required to produce the protector 14 can be reduced in comparison to a protector 14 formed with a uniform thickness around the outer periphery of the wire body 12 (see FIG. 6 (3) and (4)).

Moreover, the protector 14 is formed with the protrusions 14B projecting from the radial inside toward the radial outside between adjacent recesses 14A out of the plural recesses 14A. These protrusions 14B readily undergo deformation. This enables the cushioning properties of the protector 14 to be improved at the protrusions 14B, enabling the rattling reduction effect when the wire 10 contacts an object other than the wire 10 to be further enhanced. As illustrated in FIG. 7, the wire 10 according to the first example obtains a lower rattling measurement result value than the rattling measurement results obtained for the wire 10 according to the third example and the wire 10 according to the fourth example. The maximum external diameter dimension of the protector 14 of the wire 10 according to the first example is the same as the maximum external diameter dimension of the protector 14 of the wire 10 according to the third example.

FIG. 6 (2) illustrates a wire 10 according to a second example. The protector 14 of the wire 10 according to the second example is formed with a serrated cross-section profile. A maximum external diameter dimension of the protector 14 thereof is set smaller than the maximum external diameter dimension of the protector 14 of the wire 10 according to the first example, and is set the same as the maximum external diameter dimension of the protector 14 of the wire 10 according to the fourth example.

As illustrated in FIG. 7, the rattling measurement result for the wire 10 according to the second example was a lower value than the rattling measurement result for the wire 10 according to the fourth example, and was the same as the rattling measurement result for the wire 10 according to the third example.

As illustrated in FIG. 2A, in the wire 10 according to the present exemplary embodiment at least one of the one end portion 12A and the other end portion in the length direction of the wire body 12 is coupled to the attachment fixing section 20. The attachment fixing section 20 is coupled to at least one of the one end portion 12A and the other end portion of the wire body 12 that are exposed from the protector 14. Coupling the attachment fixing section 20 to the wire body 12 enables the wire 10 to be attached and fixed to objects other than the wire 10, for example the first mounted components 60 of the vehicle door 50 illustrated in FIG. 3.

Moreover, in the wire 10 according to the present exemplary embodiment, as illustrated in FIG. 2B and FIG. 2C the intermediate brackets 30 are retained at the length direction intermediate portion of the wire body 12. The intermediate brackets 30 are retained at the length direction intermediate portion of the wire body 12 that is exposed from the protector 14. Retaining the intermediate brackets 30 on the wire body 12 enables the length direction intermediate portion of the wire 10 to be attached to objects other than the wire 10, for example the second mounted components 62 and the second mounted component 64 of the vehicle door 50 illustrated in FIG. 3.

The protector 14 of the wire according to the present exemplary embodiment is a thermally molded body configured from a resin composition. The resin composition is configured from the matrix resin selected from the group consisting of the olefin-based thermoplastic resin and the vinyl chloride-based resin and blended with the thermally expandable microcapsules including the nitrile-based thermoplastic resin membrane. This enables the foaming ratio to be raised in the protector 14, enabling sufficient softness to be obtained, and thus enabling the rattling reduction effect to be enhanced. Moreover, the protector 14 has a high quality external appearance due to reducing the size of surface pockmarking resulting from the foaming.

Moreover, in the manufacturing method of the wire 10 according to the present exemplary embodiment, the molding apparatus 70 illustrated in FIG. 4 and the resin molding section 724 illustrated in FIG. 5 are employed to feed the resin composition in a heated state onto the outer periphery of the metal wire body 12 by extrusion molding along the length direction of the wire body 12. The fed resin composition is then cooled in order to form the resin protector 14 at the outer periphery of the wire body 12.

This enables the issue of damage to the protector 14 caused by stray strands at the end portion of the wire body 12 to be fundamentally eliminated, and moreover enables a wire 10 capable of enhancing the rattling reduction effect to be obtained.

Moreover, manufacturing efficiency can be improved since the task of passing the wire body 12 through the interior of the protector 14 can be eliminated. This enables a task performed by humans to be abolished, thus enabling manufacture of the wire 10 formed with the protector 14 to be automated.

Moreover, as illustrated in FIG. 3, the vehicle door 50 according to the present exemplary embodiment includes the door outer panel 52, the first mounted components 60, the second mounted components 62, the second mounted component 64, and the wire 10. At least part of the door outer panel 52 is made of resin. The first mounted components 60 are mounted to the door outer panel 52. The second mounted components 62 and the second mounted component 64 are mounted to the door outer panel 52 at different locations from the first mounted components 60. The wire 10 includes the wire body 12, and at least one of the one end portion 12A and the other end portion of the wire body 12 is provided with the attachment fixing section 20, while the intermediate brackets 30 are provided at the length direction intermediate portion of the wire body 12. The attachment fixing section 20 is attached and fixed to the corresponding first mounted component 60. The intermediate brackets 30 are attached and fixed to the second mounted components 62 and the second mounted component 64.

Note that the wire 10 is configured including the metal wire body 12 and the resin protector 14 integrally molded with the wire body 12 so as to cover the outer periphery of the wire body 12. The vehicle door 50 can be constructed using the wire 10, in which the need to pass the wire body 12 through the interior of the protector 14 from one end has been eliminated, thus enabling the issue of damage to the protector 14 caused by stray strands at the end portion of the wire body 12 to be fundamentally eliminated.

Moreover, since the need to pass the wire body 12 through the protector 14 is eliminated, the need to enlarge the internal diameter of the interior of the protector 14 is also eliminated, enabling the protector 14 to be formed with greater thickness. This enables the cushioning properties of the protector 14 to be improved, and thus enables the vehicle door 50 to be constructed with an enhanced rattling reduction effect when the wire 10 contacts an object other than the wire 10.

Supplementary Explanation Regarding the Exemplary Embodiment

Although the intermediate brackets are retained on the wire in the exemplary embodiment described above, the present invention may also be applied to a wire on which intermediate brackets are not retained.

Although two wire-retained portions are provided at each intermediate bracket and the stopper is provided between the wire-retained portions in the exemplary embodiment described above, in the present invention two stoppers may be applied to each intermediate bracket with a single wire-retained portion being provided between the stoppers.

Although both end portions of the wire are attached and fixed to mounted components in the exemplary embodiment described above, the present invention may be configured such that the one end portion of the wire is attached and fixed to a first mounted component, and a length direction intermediate portion of the wire is attached and fixed to second mounted components through intermediate brackets.

Moreover, the present invention may be applied to a wire on which one, two, or four or more of the intermediate brackets are retained.

Although explanation has been given regarding an example in which a back door is applied as a vehicle door in the exemplary embodiment described above, the present invention may be applied to a wide range of doors, for example front side doors or rear side doors serving as vehicle doors that are made partially of resin and that are mounted with metal mounted components.

The present application claims priority over Japanese Patent Application No. 2018-014504, filed on Jan. 31, 2018, which is incorporated in its entirety by reference herein.

The invention claimed is:

1. A wire assembly comprising:
a wire body that is made of metal; and
a protector that is made of resin, that covers an outer periphery of the wire body, and that is integrally molded with the wire body,
wherein a length direction intermediate portion of the wire body is exposed from the protector, and an intermediate bracket is retained on the length direction intermediate portion of the wire body that is exposed, and
the intermediate bracket includes:
a bracket body;
a pair of wire-retained sections that are provided at one end of the bracket body, retained so as to be capable of rotating about the wire body, and retained so as to be capable of moving relatively in a length direction of the wire body; and
a stopper that is crimped to the wire body, and that restricts relative movement of the wire body in a length direction of the bracket body.

2. The wire assembly of claim 1, wherein the protector is formed with a uniform thickness around the outer periphery of the wire body.

3. The wire assembly of claim 1, wherein the protector has a serrated cross-section profile as viewed across the length direction of the wire body.

4. The wire assembly of claim 1, wherein at least one of one end portion or another end portion of the wire body in the length direction of the wire body is exposed from the protector, and an attachment fixing section is coupled to the at least one of the one end portion or the other end portion of the wire body that is exposed.

5. The wire assembly of claim 1, wherein the protector is a thermally molded body configured from a resin composition in which a matrix resin selected from the group consisting of an olefin-based thermoplastic resin and a vinyl chloride-based resin is blended with thermally expandable microcapsules including a nitrile-based thermoplastic resin membrane.

6. A wire assembly comprising:
a wire body that is made of metal; and
a protector that is made of resin, that covers an outer periphery of the wire body, and that is closely adhered to the wire body,
wherein a length direction intermediate portion of the wire body is exposed from the protector, and an intermediate bracket is retained on the length direction intermediate portion of the wire body that is exposed, and
the intermediate bracket includes:
a bracket body;
a pair of wire-retained sections that are provided at one end of the bracket body, retained so as to be capable of rotating about the wire body, and retained so as to be capable of moving relatively in a length direction of the wire body; and
a stopper that is crimped to the wire body, and that restricts relative movement of the wire body in a length direction of the bracket body.

7. A wire assembly manufacturing method comprising:
feeding a resin material in a heated state onto an outer periphery of a metal wire body by extrusion molding along a length direction of the wire body; and
cooling the resin material so as to form a resin protector at the outer periphery of the wire body,
wherein a length direction intermediate portion of the wire body is exposed from the protector, and an intermediate bracket is retained on the length direction intermediate portion of the wire body that is exposed, and
the intermediate bracket includes:
a bracket body;
a pair of wire-retained sections that are provided at one end of the bracket body, retained so as to be capable of rotating about the wire body, and retained so as to be capable of moving relatively in a length direction of the wire body; and
a stopper that is crimped to the wire body, and that restricts relative movement of the wire body in a length direction of the bracket body.

8. A vehicle door comprising:
a door outer panel that is at least partially made of resin;
a first mounted component that is mounted to the door outer panel;
a second mounted component that is mounted to the door outer panel at a different location from the first mounted component; and
a wire assembly including a wire body, the wire assembly is attached and fixed to the first mounted component by an attachment fixing section provided at least one of one end portion or another end portion of the wire body in a length direction, and that is attached and fixed to the second mounted component by an intermediate bracket provided at a length direction intermediate portion of the wire body;

the wire assembly including:
- the wire body that is made of metal; and
- a protector that is made of resin, that covers an outer periphery of the wire body, and that is integrally molded with the wire body, wherein the length direction intermediate portion of the wire body is exposed from the protector, and the intermediate bracket is retained on the length direction intermediate portion of the wire body that is exposed, and the intermediate bracket includes:
- a bracket body;
- a pair of wire-retained sections that are provided at one end of the bracket body, retained so as to be capable of rotating about the wire body, and retained so as to be capable of moving relatively in a length direction of the wire body; and
- a stopper that is crimped to the wire body, and that restricts relative movement of the wire body in a length direction of the bracket body.

* * * * *